US006543689B2

(12) United States Patent
Sabella

(10) Patent No.: US 6,543,689 B2
(45) Date of Patent: Apr. 8, 2003

(54) CREDIT CARD AND BAR CODE READER MODULE

(75) Inventor: Paul Sabella, 6452 River Run, Columbia, MD (US) 21044

(73) Assignees: Comstar Interactive Corp., New York, NY (US); Paul Sabella, Columbia, MD (US)

( * ) Notice: Subject to any disclaimer, the term of this patent is extended or adjusted under 35 U.S.C. 154(b) by 0 days.

(21) Appl. No.: 10/147,461

(22) Filed: May 17, 2002

(65) Prior Publication Data

US 2002/0170964 A1 Nov. 21, 2002

Related U.S. Application Data

(60) Provisional application No. 60/291,317, filed on May 17, 2001.

(51) Int. Cl.[7] .............................. G06K 7/08; G06K 7/10
(52) U.S. Cl. .................. 235/449; 235/383; 235/472.01; 235/472.02
(58) Field of Search ................................ 235/449, 381, 235/383, 441, 472.01, 472.02; 379/428.01–440

(56) References Cited

U.S. PATENT DOCUMENTS

| D298,317 S | * | 11/1988 | Watanabe .................. D14/138 |
|---|---|---|---|
| 5,815,570 A | * | 9/1998 | Hannon et al. ............. 379/429 |
| 5,963,877 A | * | 10/1999 | Kobayashi ................... 455/14 |
| 6,021,187 A | * | 2/2000 | Tombetti ................ 379/110.01 |
| 6,073,034 A | * | 6/2000 | Jacobsen et al. ............ 345/102 |
| 6,418,325 B1 | * | 7/2002 | Reber et al. ........... 235/472.01 |

* cited by examiner

Primary Examiner—Thien M. Le
Assistant Examiner—April Nowlin
(74) Attorney, Agent, or Firm—Hoffman, Wasson & Gitler

(57) ABSTRACT

A caddy receivably retains a two-way messaging pager. The caddy has a connector for power and data transfer between the pager and caddy. The caddy is equipped with a magnetic strip card reader. This enables remote transactions using a magnetic strip card such as a credit card or debit card. The caddy has serial bus ports for attaching the caddy to peripheral devices such as printers and taxi fare meters.

7 Claims, 7 Drawing Sheets

CREDIT CARD AND BAR CODE READER MODULE

This application claims benefit of U.S. provisional application Ser. No. 60/291,317, filed on May 17, 2001.

BACKGROUND OF THE INVENTION

Wireless communication allows people to create many tasks without having to be near a computer or other device which cannot be easily transported. The ability to send computer generated voice messages, text messages, telefax messages, and other information through a wireless device greatly enhances the flexibility a person has in keeping in communication. The prior art does not disclose a device that can be connected with an existing pager to enable the reading of a card having a magnetic strip.

SUMMARY OF THE INVENTION

A caddy receivably retains a two-way messaging pager. The caddy has a connector for power and data transfer between the pager and caddy. The caddy is equipped with a magnetic strip card reader. This enables remote transactions using a magnetic strip card such as a credit card or debit card. The caddy has serial bus ports for attaching the caddy to peripheral devices such as printers and taxi fare meters.

DETAILED DESCRIPTION OF THE INVENTION

Figure 1:
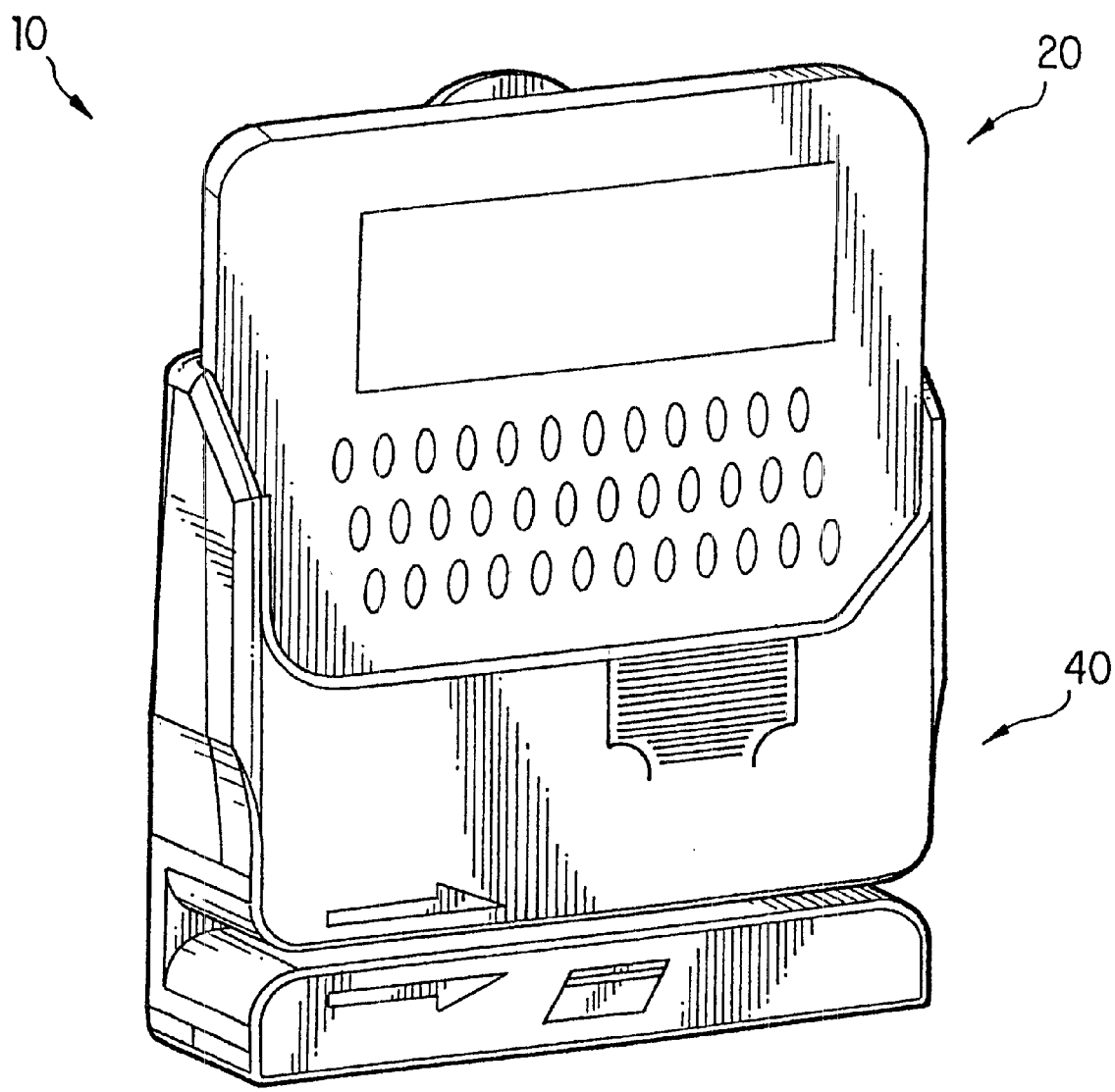
FIG. 1 is a front perspective view of the combined pager and magnetic card reader.

The combined pager and magnetic card reader 10 is seen in FIG. 1. The device has a two way messenger pager 20 combined with a magnetic card reader 40 into one unit. The card reader slot is in the front of the device and allows the user to swipe the card either horizontally or vertically.

Figure 3:
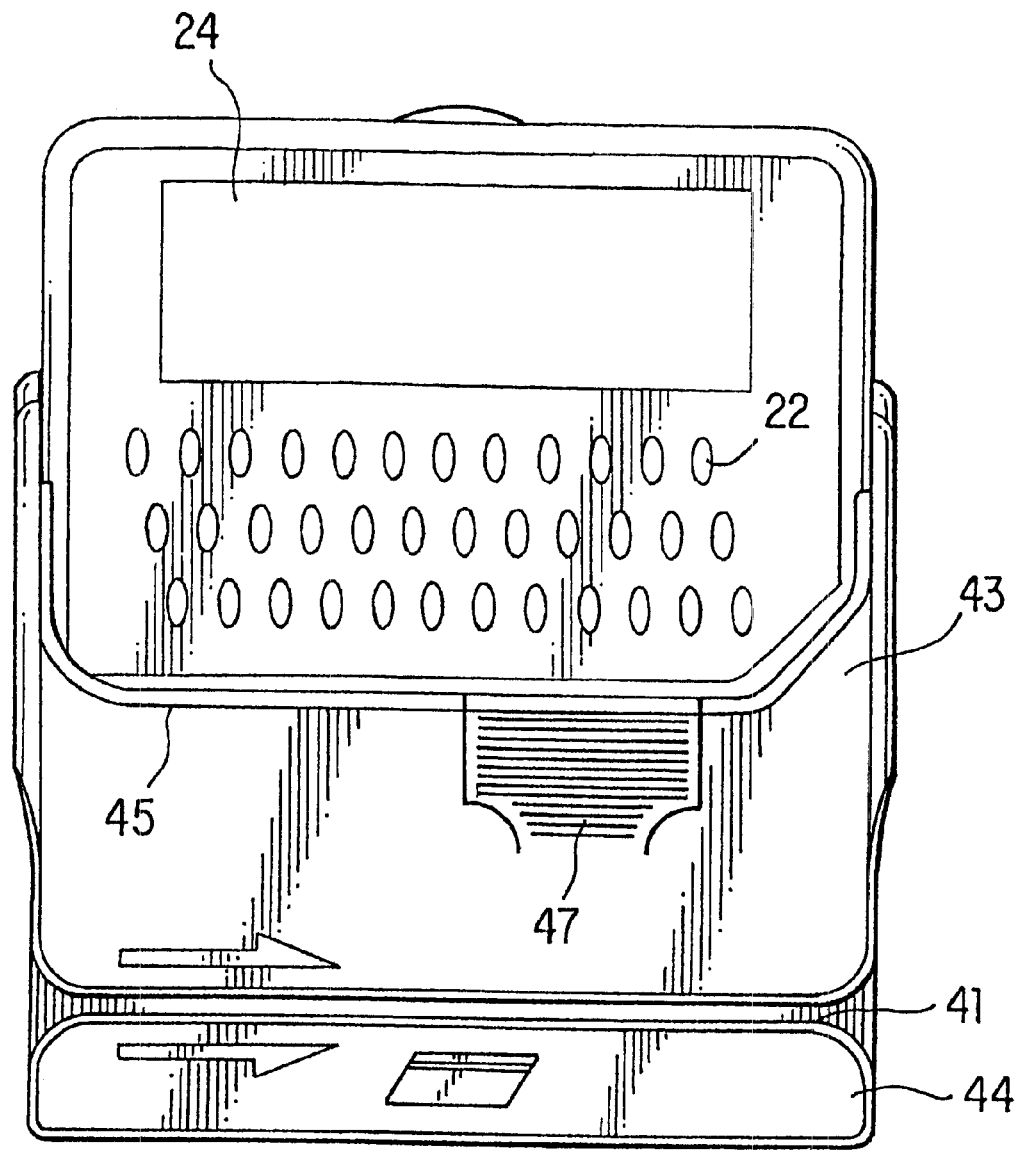
FIG. 3 is a front view of the combined pager and magnetic card reader.

Turning now to FIG. 3, the front view of the device is seen. As is shown in the figure, the pager has a screen 24 for receiving and displaying messages and a keypad 22 for the user to input commands and text. The front of the magnetic card reader 40 has an upper portion 43 and a lower portion 44. Between the two portions is the magnetic card slot 41. A card having a magnetic strip is passed through the slot 41 in order to be read. The front has a top edge 45 forming a cut-out portion for allowing continued access to the keyboard 22 when the pager is connected to the magnetic card reader. A finger grip portion 47 is formed in the front face for facilitating the insertion and removal of the pager 20

Figure 2:
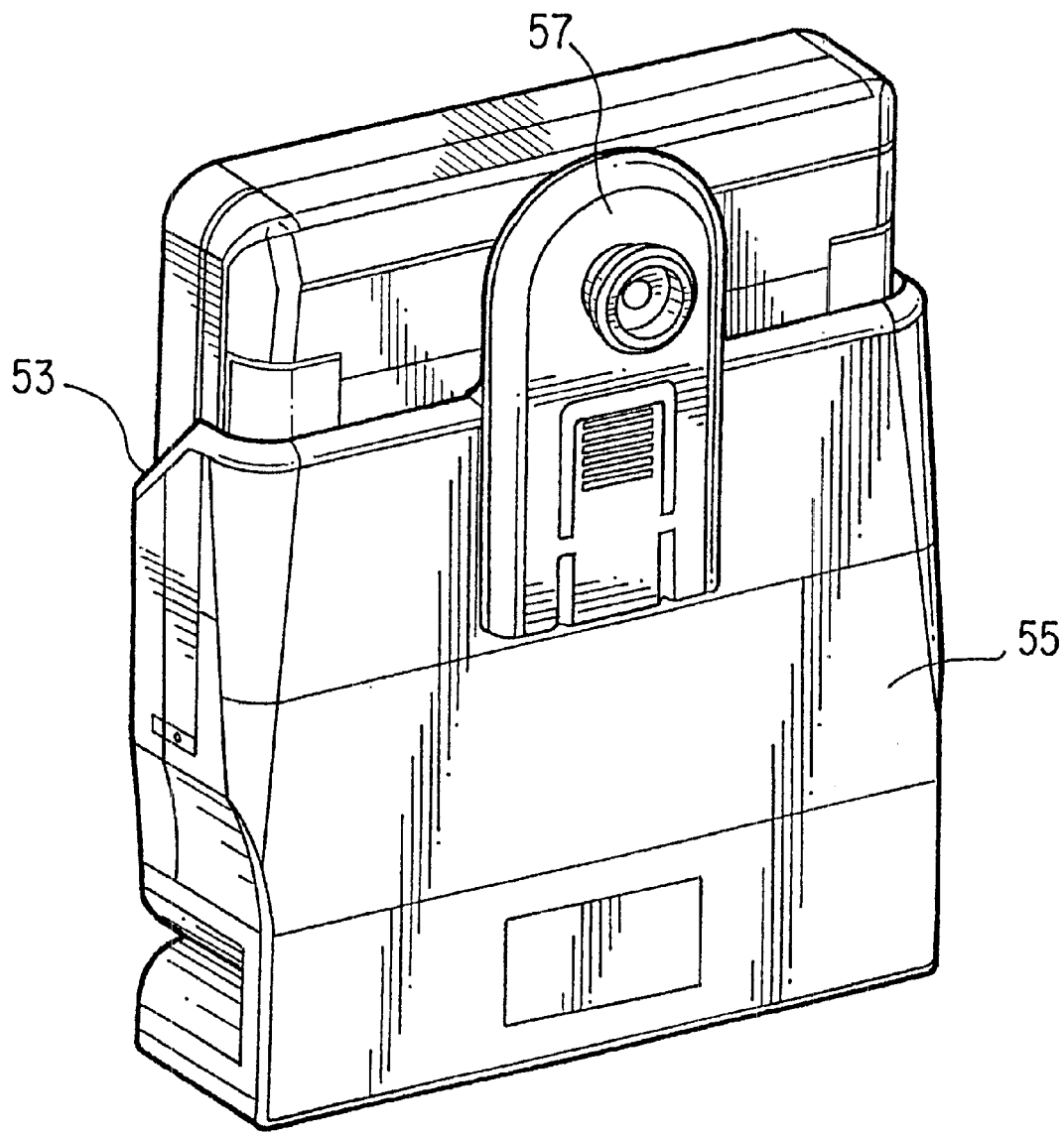
FIG. 2 is a rear perspective view of the combined pager and magnetic card reader.

FIG. 2 is a rear perspective view of the device. The back panel 55 supports a clip 57. The clip 57 can be of any conventional design for attaching the device to a user's belt, for instance. The side wall 52 of the magnetic card reader connects the back wall 55 to the front wall upper portion 43. The top edge 53 of the side wall 52 angles downwardly due to the greater height of the rear wall 55 relative to the front wall 43.

Figure 4:
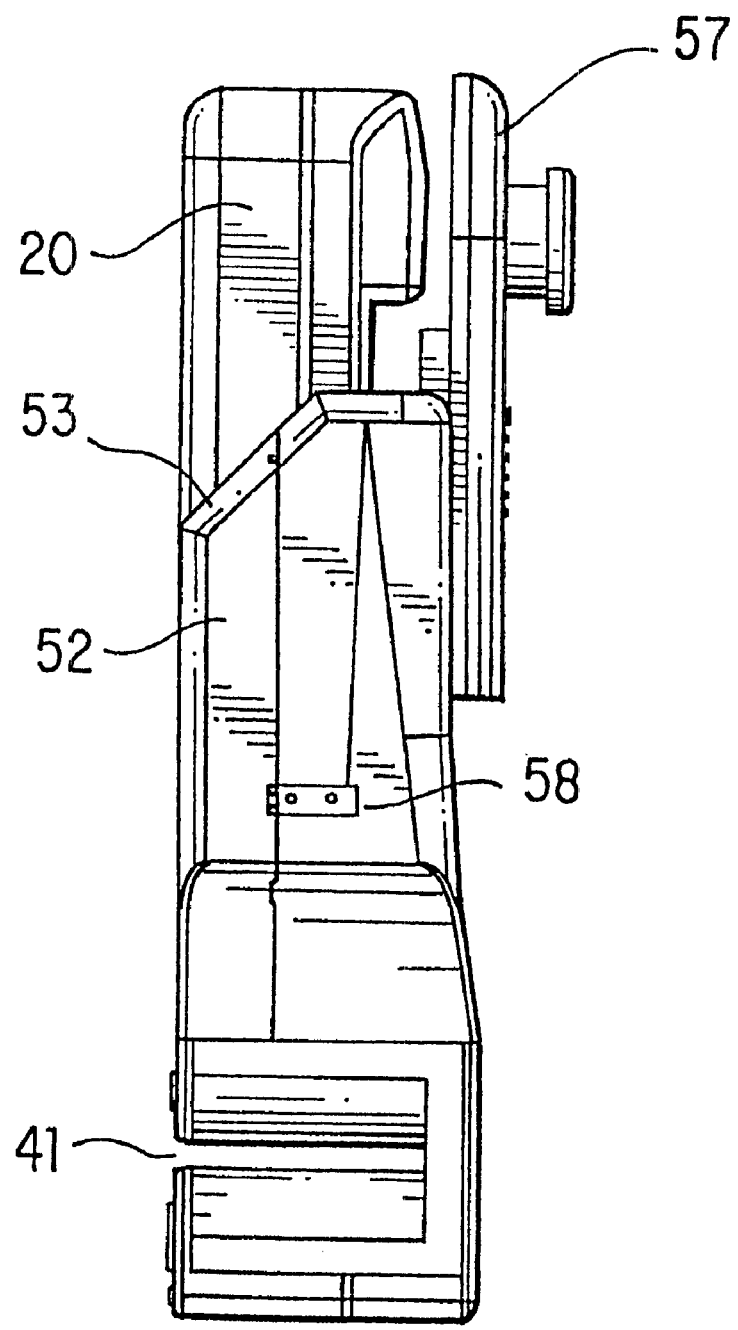
FIG. 4 is a side view of the combined pager and magnetic card reader.

FIG. 4 is the side view of the combined pager and magnetic card reader. The side wall 52 with the downwardly angled top edge 53 is clearly seen, as is its position relative to the pager 20. If desired, a serial port 58 is provided for attaching printers, other computer hard drives, and the like.

Figure 5:
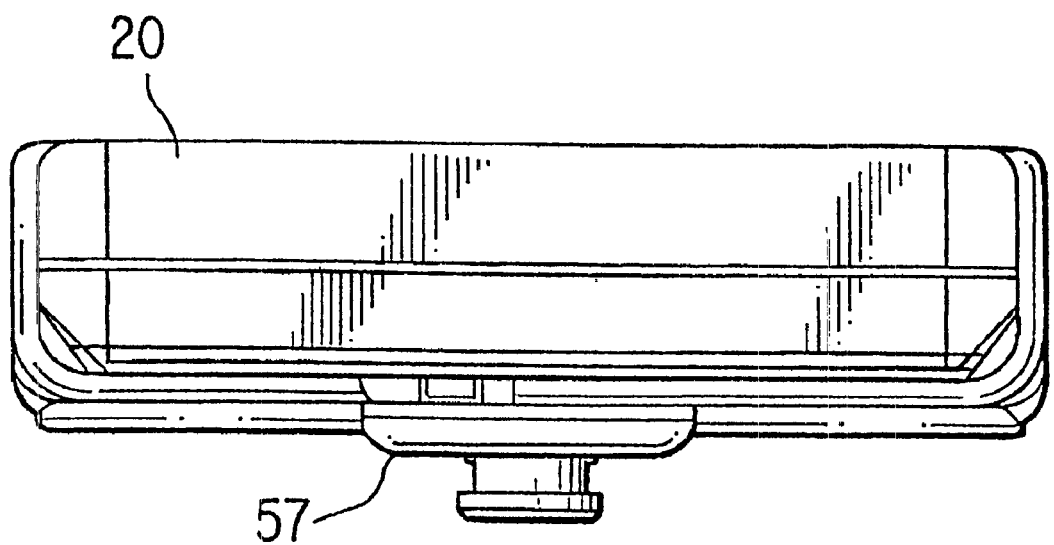
FIG. 5 is a top view of the combined pager and magnetic card reader.

FIG. 5 shows the top view of the device. As can be seen, when the two units of the pager 20 and magnetic card reader 40 are connected, they appear to be as one piece.

Figure 6:
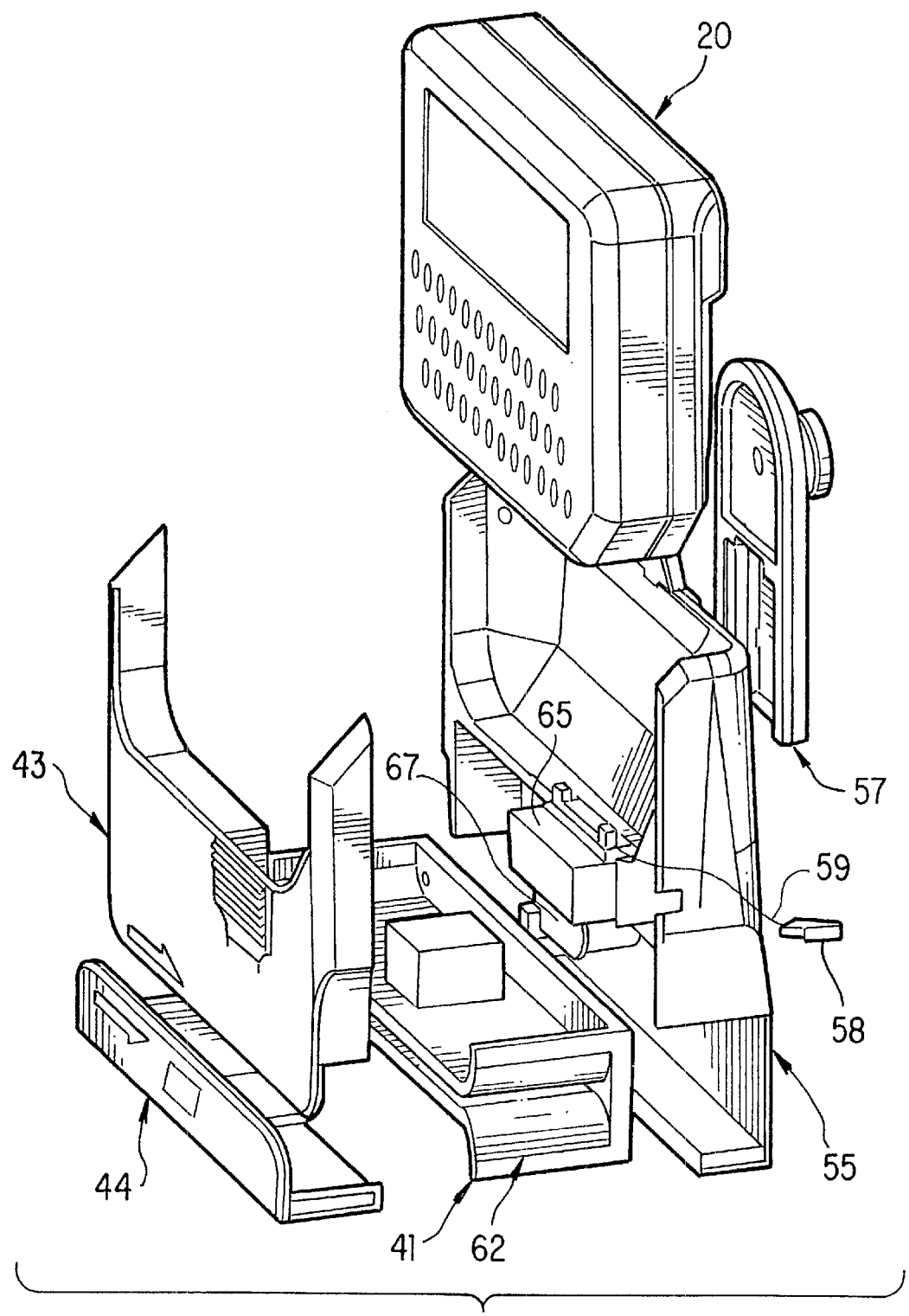
FIG. 6 is an exploded view of the combined pager and magnetic card reader.

An exploded view of the device is shown in FIG. 6. Pager 20 is removably received within the card reading module 40. The card reading slot 41 houses the magnetic strip reader 62. The bottom front panel 44 extends below the card reading slot 41 and the upper front panel 43 extends above the card reading slot 41. The front panel 43 is formed as one piece with the side panels 52. Rear panel 55 also has side panels formed as one piece. When the front panel 43 and rear panel 55 are connected to one another, the side panels complete channels for receiving and retaining the pager 20. The pager 20 has a serial bus port in its bottom surface. The serial bus port engages a connector 65 so that the magnetic strip reader 62 receives power from the battery of the pager 20. The first connector 65 also provides for data transfer between the pager 20 and the caddy. A second connector 67 communicates between the magnetic strip reader and first connector 65 via a cable (not shown). The magnetic card reading module 40 can also have one or more serial bus port(s) 58 to connect the device to a peripheral device such as a printer, bar code reader or personal computer. The serial bus ports are connected to the first connector by a second cable 59.

There are many applications for the invention. It allows for remote credit card transactions. One specific application is the connection of the device to a taxi meter through the serial bus port 58. The amount of the fare and transaction approval can be communicated between the pager and applicable financial institution.

Figure 7:
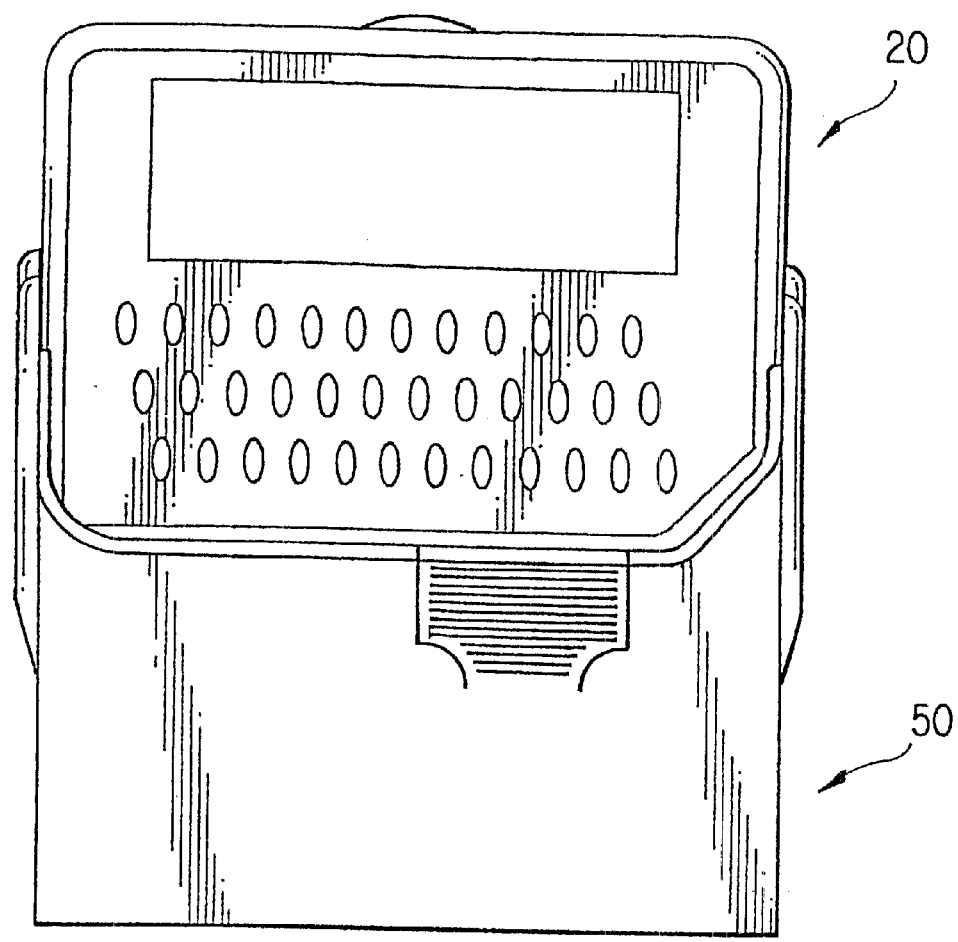
FIG. 7 is a front view of the pager combined with an optical code reader.
Figure 8:
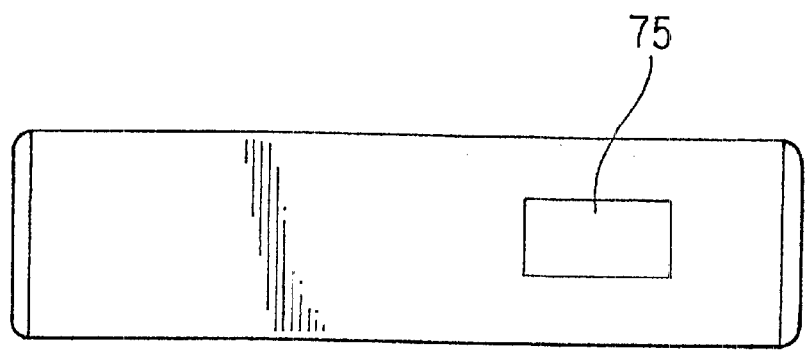
FIG. 8 is a bottom view of the caddy for the pager having an optical code reader.

FIG. 7 shows a similar device to that shown in FIGS. 1–6 but having a caddy combinable to a pager having an optical character reader (OCR) 75, commonly known as a bar code reader, in the bottom of the caddy. The bar code reader 75 can scan any bar code placed under the pager caddy when the bar code reader is activated. The bar code reader would be connected to the first connector 65 by a cable. FIG. 8 shows the bottom of the device with the bar code reader 75 clearly seen.

While the invention has been described with reference to preferred embodiments, variations and modifications would be apparent to one of ordinary skill in the art without departing from the scope of the invention. Consequently, the appended claims should not be limited to their literal terms, but should be broadly construed in accordance with the scope of the invention, as described above.

What is claimed:

1. A pager caddy, comprising:
   a housing, said housing having a cradle to receivably retain a pager,
   a magnetic strip reader, located in the housing, and
   a connector for engaging a pager to supply power and data transfer from the pager to said magnetic strip reader.

2. The pager caddy of claim 1, further comprising serial bus ports for connecting said caddy to peripheral devices.

3. The pager caddy of claim 1, further comprising a slot for receiving a card having a magnetic strip.

4. The pager caddy of claim 3, wherein said slot is in a front face of said housing.

5. A pager caddy, comprising:
   a housing receivably retaining a pager,
   a magnetic strip reader, located in the housing,
   a first connector for supplying power and data transfer, and
   a second connector for connecting the magnetic strip reader to the pager, the second connector attached to the first connector by a first cable.

6. The pager caddy of claim 5, further comprising a serial bus port in said housing, said serial bus port connected to the first connector by a second cable.

7. A communication device, comprising:
   a pager,
   a housing, said housing having a cradle to receivably retain a pager,
   a magnetic strip reader, located in the housing, said pager and caddy connected to have power and data transfer between said pager and magnetic strip reader.

* * * * *